United States Patent [19]

Breda

[11] Patent Number: 4,979,530

[45] Date of Patent: Dec. 25, 1990

[54] MODULAR VALVE ASSEMBLY

[75] Inventor: Silvano Breda, Thornhill, Canada

[73] Assignee: Ameri-Can Brass Faucet Inc., Downsview, Canada

[21] Appl. No.: 456,208

[22] Filed: Dec. 20, 1989

Related U.S. Application Data

[63] Continuation of Ser. No. 137,816, Dec. 24, 1987, abandoned.

[51] Int. Cl.$^5$ .................. F16K 11/076; G05D 11/05
[52] U.S. Cl. ................................ 137/100; 137/270; 137/454.2; 137/597
[58] Field of Search ............ 137/100, 261, 270, 270.5, 137/606, 607, 597, 876, 359, 360, 613, 454.2, 454.6; 251/310

[56] References Cited

U.S. PATENT DOCUMENTS

| | | | |
|---|---|---|---|
| 2,800,137 | 7/1957 | Fraser | 137/607 X |
| 2,847,027 | 8/1958 | Kumpman | 137/597 |
| 3,329,162 | 7/1967 | Sanford | 137/360 X |
| 3,416,568 | 12/1968 | Parr | 137/606 |
| 3,448,755 | 6/1969 | Symmons | 137/597 X |
| 3,529,621 | 9/1970 | Christiansen | 251/310 X |
| 4,033,370 | 7/1977 | Egli | 137/100 |
| 4,037,622 | 7/1977 | Osheroff et al. | 137/597 |
| 4,403,626 | 9/1983 | Paul | 137/876 X |
| 4,580,600 | 4/1986 | Mazzei et al. | 137/597 |
| 4,589,438 | 5/1986 | Breda | 137/876 X |

Primary Examiner—Stephen M. Hepperle
Attorney, Agent, or Firm—Neil H. Hughes; Ivor M. Hughes

[57] ABSTRACT

A valve housing is claimed which provides for diversion of fluid flow into a valve cartridge from a selected inlet through a selected outlet to the valve cartridge. An opening is provided in the housing in which the cartridge is located. The housing also has diverting mechanisms disposed between the cartridge and the fluid inlets. The diverting mechanisms may be adjusted to orient the fluid flow into the valve cartridge. For example, if an installer incorrectly installs the hot and cold water inlets to the housing, the diverting mechanism may be moved to provide the correct orientation of flow into the valve cartridge.

39 Claims, 9 Drawing Sheets

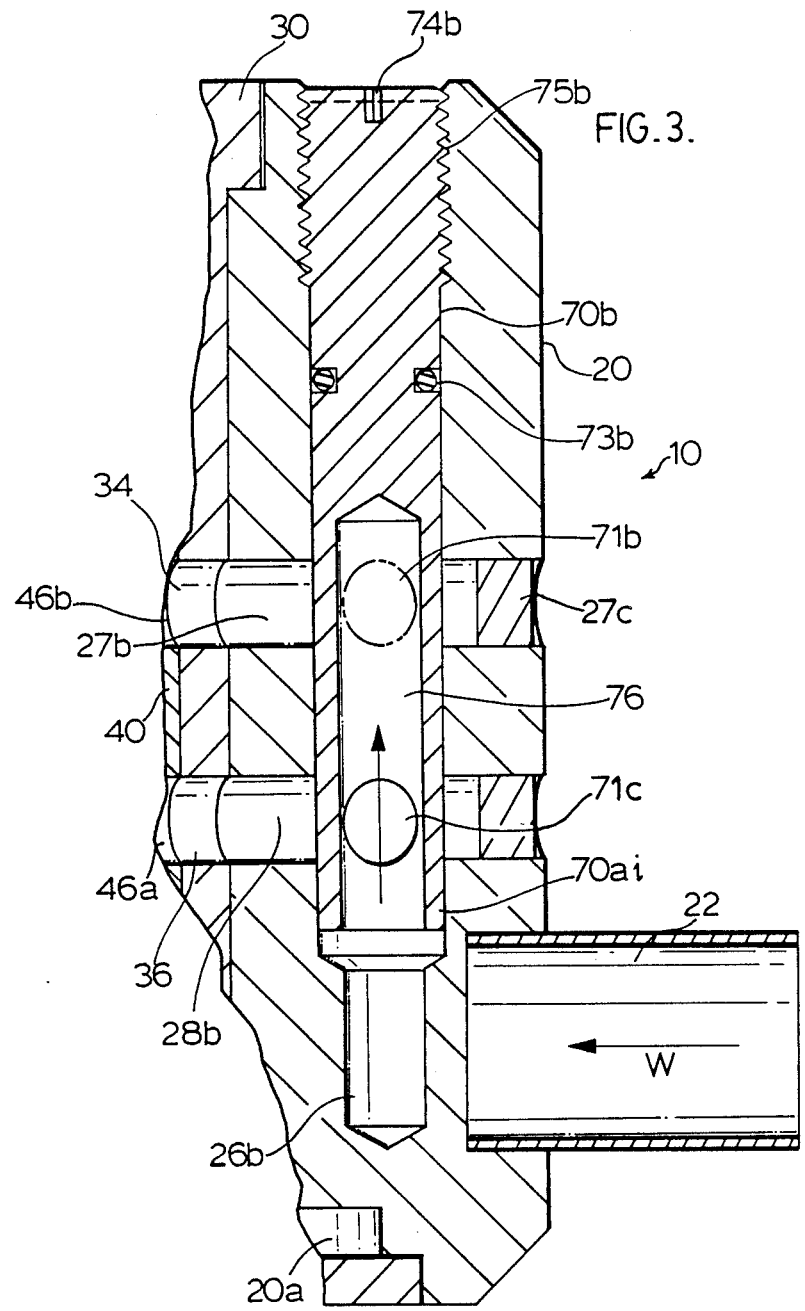

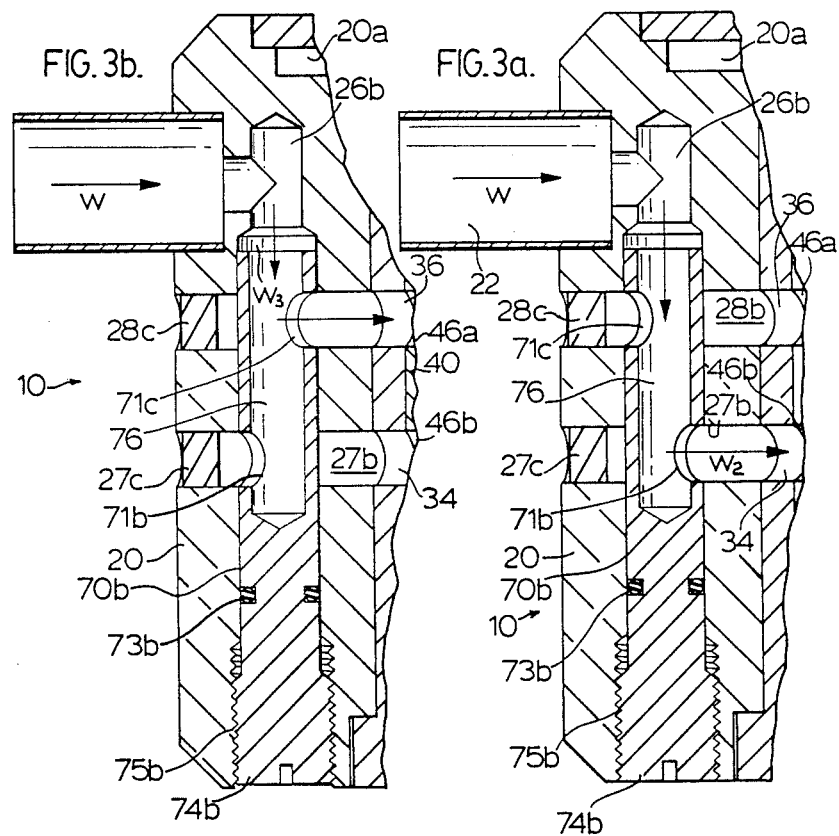
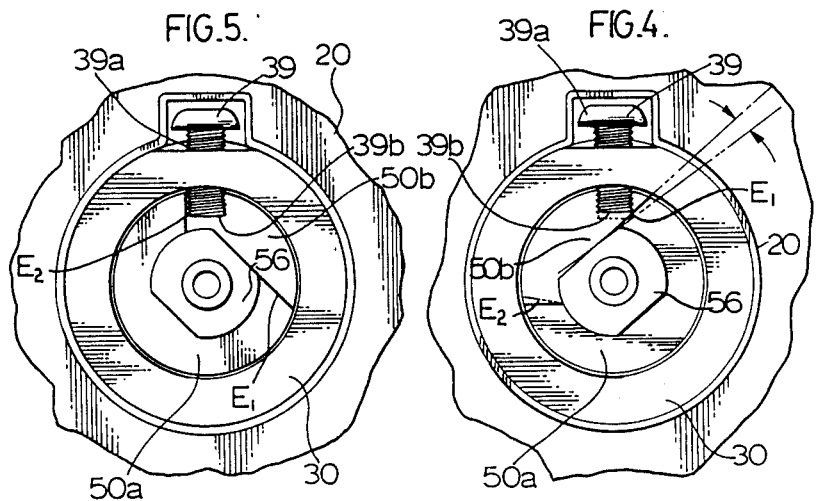

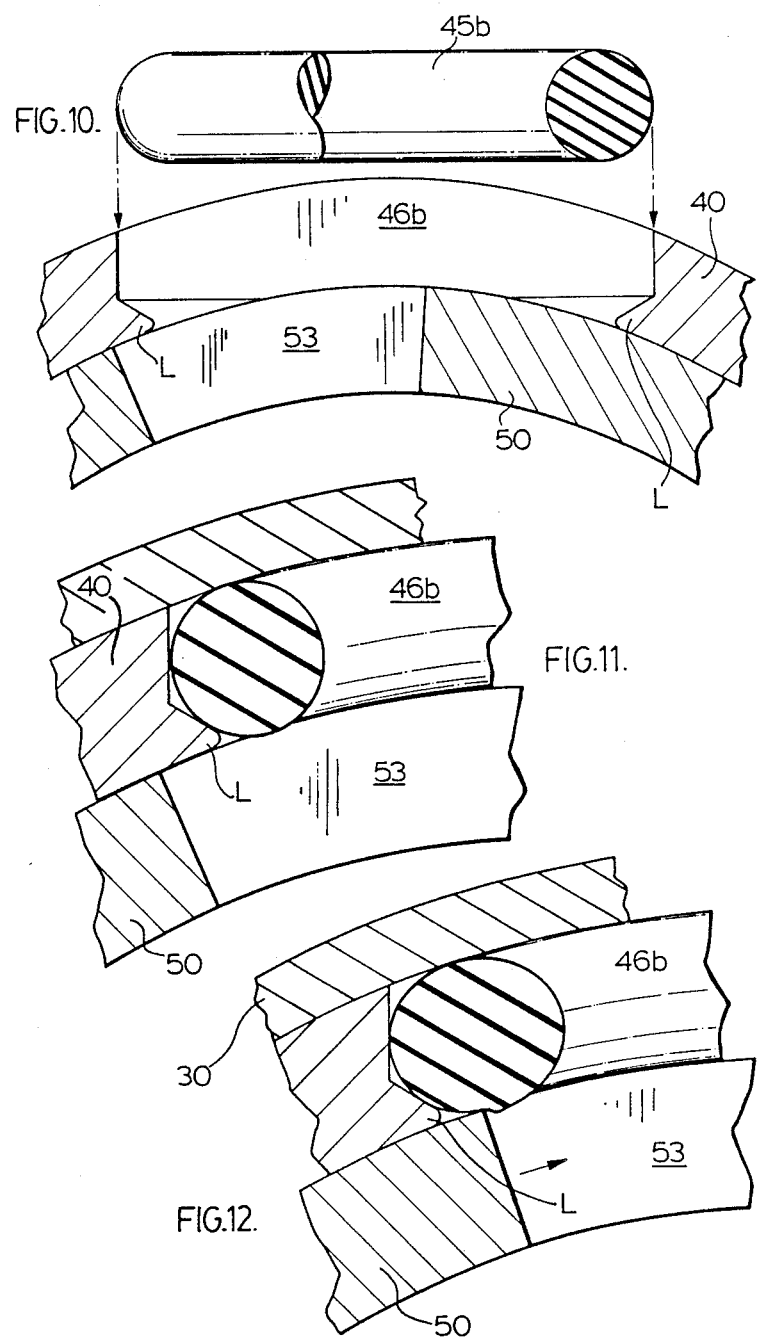

MODULAR VALVE ASSEMBLY

This is a continuation of application Ser. No. 137,816, filed Dec. 24, 1987, now abandoned.

FIELD OF INVENTION

The present invention relates to mixing valves and particularly to those found within shower installations.

BACKGROUND OF THE INVENTION

The prior art contains a host of valves used to compensate for temperature differentials which occur when using a shower facility. Some of these valves rely on thermostatic devices which are connected to actuating members within a valve and, for example, close down or reduce the opening of the hot water inlet of the valve thus reducing the risk of the user being scalded. Further, the prior art contains pressure compensating valves for use in shower facilities which respond to a pressure differential thereby reducing, for example, the volume of hot water passing through the outlet of the valve and reducing the risk of the user being scalded. The present invention in a preferred embodiment thereof relates to a unique pressure balancing valve which has application within a shower facility.

U.S. Pat. No. 4,469,121 and the corresponding Canadian patent, No. 1,186,971, assigned to Stanadyne Incorporated, describes a cycle valve for mixing hot and cold water including a sleeve having axially spaced and radially non-aligned hot and cold water inlets, the outlets in the sleeve being intermediate the afore-mentioned inlets. The valve further incorporates within the sleeve a non-reciprocal valve member to control the mixture of hot and cold water at the sleeve outlet. The valve member incorporates a hollow stem having water inlet and outlet ports wherein a purported seal is reciprocally moveable in relation to a pressure balancing spool disposed within the stem, said spool for balancing the pressures between the hot and cold water flows. The afore-mentioned structure does not describe a truly sealless structure wherein the seals may be corroded by the action of the hot water and/or scale and sediment during the flow of hot water. Further the afore-mentioned patents do not describe a cartridge-type valve mounted within a housing incorporating diverting means to allow for ease of installation and maintenance of the valve by the installer or householder.

U.S. Pat. No. 3,448,755, by Symmons, describes a non-scald mixing valve incorporating a similar pressure balancing spool as described in the afore-mentioned references incorporating therein a diverter member having two radially aligned bores in communication with the outlet passageway. The diverter valve comprises an internal valve casing that is formed integral with and in part consists of the outer wall of the valve body and the internal partitions therein. This is best observed in relation to FIG. 2. However the valve presented is not a cartridge valve and the diverting means contained therein is merely for diverting the outlet from one path to another. Further the patent does not describe diverting means disposed proximate the inlet of the valve within the housing for the valve, said housing containing an opening in communication with the inlet ports, wherein a cartridge is disposed, said cartridge being removable and replaceable. The afore-mentioned patent further does not allow for the installer to readily rectify an error in connecting the hot and cold water supplies to the valve, or allow for ease of maintenance thereof.

U.S. Pat. No. 3,539,099, by Grohe of Germany, describes a mixing valve unit which can be inserted into the housing of a hot and cold water mixing faucet which is operated by a thermostat to vary the relative amounts of hot and cold water in accordance with the temperature of the mixed water. The unit can be removed and replaced through an opening in the housing. However the afore-mentioned structure does not incorporate an integrated modular valve but merely provides a removable sub-assembly separate from the actuating mechanism of the valve and incorporating only the thermostatically controlled balancing portions of the valve.

U.S Pat. No. 4,417,602 describes a valve incorporating a sleeve having a water inlet and a water outlet. The valve includes a stem moveable within the sleeve to control the flow of water from the inlet to the outlet. A pressure member is positioned within the sleeve wherein a fixed seal is positioned between the stem and the pressure member, and further a second seal is disposed, but in the stem in engagement with the sleeve. Further, at column 2, line 22, the valve construction is embodied as a cartridge wherein all of the components are assembled into a single unit which may be quickly and simply replaced if the valve should leak. However the afore-mentioned reference does not incorporate diverting means which further allows for ease of installation or maintenance of the valve should the installer incorrectly install the hot and cold water inlets to the valve. Further, the afore-mentioned reference incorporates grommets which will deteriorate when the flow of water, and specifically hot water, acts upon the grommet carrying sludge and scale from the water tank and lines. Such action will result in the deterioration of the grommet unlike that found in the seal arrangement of the instant invention.

Canadian Patent No. 1,014,449, corresponding to U.S. Pat. No. 3,960,016, describes a water mixing valve with a temperature indicator. Specifically referring to FIG. 2 of the afore-mentioned reference, the construction of the invention described therein may be observed, incorporating pressure equalizing valve 86 which is slidably disposed within the main valve assembly. The operation of the valve and the pressure balancing aspects thereof are described at page 8 of the afore-mentioned reference which describes thereat further references on pages 7 and 8, such description being consistent with the teachings of the authors of U.S. Pat. Nos. 2,308,127, 3,099,996 and 3,448,755 previously described, acknowledging the fact that mere pressure balancing found within the valve is not new within the prior art. It is the unique combinations in the afore-mentioned patents described above which distinguish the structures beyond the prior art of record, thus allowing for patentability.

U.S. Pat. No. 2,412,037 describes a valve containing concentric sleeves wherein the ports therein align to allow the passage of fluid therethrough.

U.S. Pat. No. 4,312,377 describes a tubular valve for the controlling of fluids incorporating an outer tubular shell, having therein deformable grommets enclosed within a sealing space between the outer shell and the inner tube providing lateral tubular extensions projecting through the outer ports.

U.S. Pat. No. 4,493,343 describes a single lever faucet assembly having a faucet control lever which is reversibly mountable on either side of the faucet spout without having to switch positions of the hot and cold water supplies lines thereto. The faucet further includes a valve cartridge which is easily disconnected from the faucet control lever for replacement. However the afore-mentioned reference does not teach the incorporation of the actuation or control lever in combination with the cartridge being replaceable as an integrated unit. Further the afore-mentioned reference does not include a housing containing inlet means for the hot and cold water and further containing therein diverting means for allowing the ease of installation of the housing and the easy replacement of the cartridge by an installer or householder.

Canadian Patent No. 1,104,548 describes a seal member which is moveable within a sleeve to rotate the seal member out of line of flow of the water supply during operation of the valve yet moving it back into registration of the water discharge port 38 when the water is shut off. However such an arrangement is not found to describe a pressure balancing integrated cartridge system as does the instant invention.

Further examples of sealing members positioned on a sleeve out of the path of flow through the stem outlet port are found within U.S. Pat. No. 4,395,018 and Canadian Patent No. 1,151,629. These references are sighted for information purposes only.

Nowhere within the prior art is found an integrated modular valve assembly which incorporates diverting means within a housing for a valve, said diverting means for communication with the inlet means disposed within the housing of the valve, said diverting means being moveable to allow for registration of a variable number of inlet ports to allow flow of water to a mixing cartridge assembly disposed within the valve housing.

Further, nowhere in the prior art is there found such a structure as described above further containing a pressure balancing spool disposed within the cartridge, said cartridge being easily removed from said housing and containing therein all of the working portions of the valve including the actuating or control lever, the pressure balancing spool if used, and the remaining portions allowing the registration of the inlet ports with a outlet mixing chamber disposed within the housing. It is not absolutely critical that the housing contain a mixing chamber but it is preferred.

Therefore it is an object of this invention to provide an easily installed valve assembly which is easy to maintain by the householder without the need of contracting specialized installers.

It is a further object of this invention to provide a modular valve assembly which incorporates components which are integrated and perform all of the operating functions of the valve, found within a replaceable cartridge contained therein.

It is a further object of the invention to provide diverting means use with a valve assembly which allow for ease of installation and maintenance.

It is a further object of this invention to provide a safe valve assembly for use in shower installations reducing the risk of scalding the user.

It is a further object of this invention to provide an integrated valve assembly which may be installed in either a vertical or horizontal plane which still functions with all the attributes of the valve in either plane with the exception of the balancing spool.

Further and other objects of the invention will become apparent to a man skilled in the art when considering the following summary of the invention and the more detailed description of the preferred embodiments illustrated herein.

SUMMARY OF THE INVENTION

According to these ends there is provided for use with at least one fluid, and preferably said at least one fluid being hot and cold water, a valve housing having a separate valve actuation means contained therein in use, the valve actuation means being a cartridge assembly, said valve housing having two ends and having disposed therein at least one inlet passages and at least one outlet passage, said housing comprising at least one, preferably cylindrical, opening extending within said housing from proximate one end thereof and extending towards the other end thereof, at least one each of said inlet passages and outlet passages being in communication with said at least one opening, each opening having disposed therein a flow diverting means of a predetermined dimension having two ends and compatibly shaped with each housing opening and extending from one end within said housing in use, each diverting means being hollow throughout some of its predetermined dimension proximate an inlet passage and having at least two ports disposed upon the perimeter of each diverting means and joined by said hollow, each diverting means being moveable to align the hollow proximate with an inlet passage if not initially aligned, one of said at least two ports being moveable into alignment with one of said at least one outlet passages when the hollow is aligned with an inlet passage; whereby in operation when one of the at least one inlet passages of said housing is aligned with one of said hollows of said diverting means, the flow of fluid will pass through one of said at least one inlet passages to one of said hollows of the diverting means which if necessary may be moveably aligned with one of said at least two inlet passages, the fluid thereafter passing through the hollow extending through the interior of said diverting means and the aligned inlet passage to one of said at least two ports of the diverting means, whereat the fluid passes from the housing of the valve to the valve actuation means of the valve being a cartridge assembly contained within said housing, whereby said diverting means may be moved to redirect the flow of fluid from said at least one inlet passages to facilitate the proper functioning of the valve actuation means.

According to yet another aspect of the invention, the valve actuation means contained within the valve housing may comprise a spool cartridge comprising at least two concentric cylinders of predetermined length one moveable and one stationary in use wherein at least one of the concentric cylinders contains seals disposed within openings therein, said openings being disposed about the perimeter of the at least two concentric cylinders wherein the seals are disposed in some of the openings on one of the cylinders in use away from the flow of fluid during operation of the valve and are aligned into registration with openings disposed on another cylinder when the fluid flow is ceased.

According to yet another aspect of the invention, the valve actuation means may comprise a spool cartridge, said spool cartridge comprising at least two concentric cylinders wherein are disposed openings about the circumference of the at least two cylinders, some of said openings on one of said cylinders containing therein sealing means for engagement with corresponding openings disposed within another of said cylinders, one of said cylinders comprising a moveable stem portion having contained therein openings for registration with the openings disposed within the other cylinders, some of said openings disposed within said moveable stem for engagement with sealing means disposed within one of said cylinders when the flow of the fluid within the valve actuation means ceases thereby insuring the integrity of the sealing means and reducing the risk of deterioration thereof; preferably said moveable stem portion having disposed therein a hollow wherein a pressure balancing spool having a moveable spool element disposed therein and having second inlet passages disposed therein, preferably said spool being substantially cylindrical in shape and being contained within the hollow within said stem, said second inlet passages being a communication with a hot and a cold water chamber disposed within the spool element which effects the pressure balancing action of the actuation means, said hot and cold water chambers being in communication with second outlet passages disposed within the perimeter of the spool whereby when the flow of hot water is increased in relation to the flow of cold water, said spool element will move in a direction to compensate for the increase in hot water in a direction whereby the openings disposed within the spool for the hot water are closed by the blocking movement of the perimeter of the spool element in relation to the openings disposed within the perimeter of the spool, wherein if the cold water volume increases beyond a set level of the valve, said spool element will move in a direction such that the perimeter of said spool element will narrow the openings disposed within the spool for cold water resulting in a reduction of the volume of cold water passing to the spool and thus balancing the valve at its preset operating temperature.

According to yet another aspect of the invention, there is provided a reversible modular valve assembly, for use with hot and/or cold water said modular valve assembly comprising a housing and valve, said valve including a replaceable cartridge assembly housing having two ends and having at least two inlet passages disposed within said housing for allowing the passage of hot and cold water through each of one of said inlet passages, said housing comprising at least one preferably cylindrical opening extending within said housing from proximate one end thereof extending towards the other end thereof, said at least one opening having disposed upon the perimeter thereof at least two outlet passages being in communication with said at least one opening and being disposed about the perimeter of the extension of said opening; said opening having disposed therein at least one flow diverting means having two ends and being of a predetermined dimension compatibly shaped with said at least one opening and extending within said housing in use, each diverting means being hollow throughout some of its predetermined dimension proximate an inlet passage and having at least two ports joined by said hollow disposed upon the perimeter thereof, said diverting means being moveable to, if not already aligned, align the hollow thereof with one of said at least two inlet passages of said housing wherein one of said ports of said diverting means is moveably aligned with one of said outlet passages of said openings when the hollow is aligned with one of said at least one inlet passages, whereby in operation when one of the at least two inlet passages of said housing is aligned with the hollow of said diverting means, the flow of fluid will pass through one of said at least two inlet passages through said hollow of the diverting means, through the hollow extending through the interior of said diverting means to one of said at least two ports through to one of said at least two outlet passages whereat the hot and/or cold water passes from the housing of the valve to a valve actuation means of the valve contained within said being a cartridge assembly housing, whereby said diverting means may be moved to redirect the flow of hot and/or cold water from said at least two inlet passages to facilitate the proper functioning of the valve actuation means; said housing further comprising at least a second opening extending from proximate one end of the valve housing to proximate the other end of the housing, said at least a second opening having contained therein in use a replaceable cartridge comprising the valve actuation means of the valve, said replaceable cartridge having two ends and having disposed at one end thereof control means for controlling the positioning of the valve, said control means allowing for the movement and registration of the components within the cartridge assembly, said cartridge assembly comprising at least two hollow cylindrical members, said at least two hollow cylindrical members having disposed within the circumference thereof between their ends openings which are in registration with the outlet passages of said housing to allow for introduction of hot and cold water into the cartridge assembly, some of said openings on one of said cylinders including sealing means therein for sealing engagement with some of the openings on another of said cylinders in use, one of said at least two cylindrical members comprising a stem portion having disposed at one end thereof the control means of the valve cartridge, said stem portion extending from one end of the housing and preferably being hollow at said one end thereof remote said control portion, said stem portion having disposed therein about the circumference thereof between the ends thereof openings which align in use with the openings of one of the remaining cylindrical portions containing the sealing means, said stem portion being moveable in relation to said cylindrical portions and to the sealing means contained therein wherein some of the sealing means disposed within some cylindrical portions are out of alignment with the flow of hot and/or cold water during the operation of the valve and engage some of the openings of said stem portion only when the valve flow ceases and the openings containing the sealing means are in registration with some of the openings disposed within the stem portion, said stem portion having contained therein openings passing through to the hollow thereof some of said openings being in communication with some of the openings disposed upon the remaining cylindrical members and being in communication with the outlet passages disposed within said housing, preferably the housing having disposed therein a mixing chamber being in communication with the outlet passages of said housing when transferring the water from the cartridge portion of the valve to the housing portion of the valve through to a faucet or shower head; preferably the stem portion of said cartridge having contained within the hollow thereof a pressure balancing spool having a moveable spool element disposed therein, the spool having second inlet passages and second outlet passages disposed upon the circumference thereof, said second inlet passages being in communication with a hot water first chamber and a cold water second chamber, said second inlet passages allowing for the passage of water into said chambers thus affecting the pressure balancing of the valve assembly, said spool element comprising a wall portion having two ends separating said first and said second chambers, said wall portion having disposed within the surface thereof substantially concaved portions of predetermined dimensions which translate any pressure gradient between said first chamber and said second chamber, said spool element thus floating within the hollow of said spool in a direction consistent with the pressure gradient between said first and said second chamber as exerted upon the wall portions thereof allowing for the movement of said spool element in the direction of the higher water pressure, wherein the perimeter of the spool element moves in relation to the openings disposed upon the perimeter of the spool thus affecting a reduction in the passage through which the fluid exerting the greater pressure passes.

According to yet another aspect of the invention, the valve assembly may comprise stop means disposed within the stem portion of the cartridge for limiting the movement of the stem portion thereof.

According to yet another aspect of the invention, the seals disposed within the at least two hollow cylindrical members are maintained out of line of the flow of at least the hot water of the valve assembly in use.

According to yet another aspect of the invention, means may be provided within the valve assembly for providing volume adjustment in the valve operation.

According to yet another aspect of the invention, the pressure balancing spool of the valve actuation means may comprise a washerless spool element being manufactured with close tolerances to be contained within a hollow of the spool of the valve actuation means, said pressure balancing spool element comprising no washers yet being moveable within the hollow of said spool, and having sealing surfaces disposed on the perimeter thereof when manufactured.

According to yet another aspect of the invention, the valve housing may incorporate outlet diverting means in communication with said housing to allow for diversion of fluid from the outlet of said housing to a faucet or to a shower head.

According to yet another aspect of the invention, the openings within some of the cylinders may comprise bevelled portions within the perimeter of said openings which anchor the sealing means in said openings; preferably said sealing means being oversized resilient sealing rings.

BRIEF DESCRIPTION OF THE DRAWINGS

FIG. 3 is a close-up cross-sectional view of the valve assembly detailing the diverter mechanism thereof in a preferred embodiment of the invention.

FIGS. 3a and 3b are similar views to FIG. 3 with the fluid flow being illustrated and the functioning of the diverting mechanism and the interrelationships thereof with the components of the housing in a preferred embodiment of the invention.

FIGS. 4 and 5 are top views illustrating the interrelationship of the actuating portions of the valve assembly and blocking mechanisms thereof in a preferred embodiment of the invention.

FIGS. 10, 11 and 12 illustrate in close-up cross-sectional view the resilient seals 45b positioned and anchoring within the opening 46b of internal sleeve 40 in a preferred embodiment of the invention.

DETAILED DESCRIPTION OF THE PREFERRED EMBODIMENTS

Figure 1:
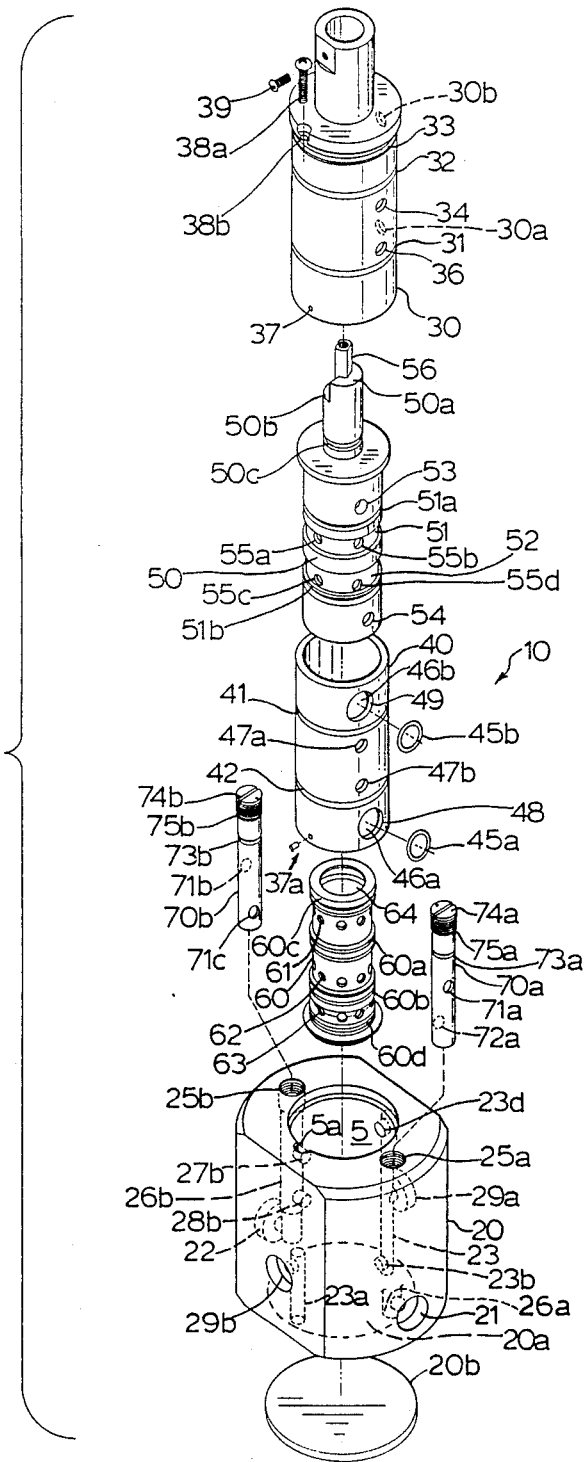
FIG. 1 is an exploded perspective view of the valve assembly itemizing all the components thereof in a preferred embodiment of the invention.

Referring now to FIG. 1, the valve assembly 10 is illustrated in exploded perspective view in order to detail all of the components thereof and the marrying of said components. It is of course not necessary to limit the construction of the valve assembly as illustrated in FIG. 1 and such is provided for example only. Therefore within valve assembly 10 there is found a housing 20 having internal channels formed therein for the passage of water to and from the valve cartridge in use. There is therefore provided an inlet 21 and 22 at opposite sides of the valve housing. The valve housing is of a predetermined height such that the cartridge when assembled will fit within an opening 5 found therein. The opening 5 is in communication at the bottom thereof with a mixing chamber 20a when the cartridge is inserted into the housing. The mixing chamber is defined by the bottom of the cartridge not shown and the bottom of the housing 20b. In a preferred embodiment of the invention, 20b is removable in order to allow for the proper manufacture of the housing 20 with all of the interrelated channels and waterways therein. Thus is provided inlet channels or openings 21 and 22 and outlet portions 29a and 29b. Inlet portions 21 and 22 allow for the introduction of the hot and cold water into the valve assembly. The inlet portions 21 and 22 have in communication therewith extending upwardly therefrom substantially cylindrical waterways 26b and 26a not shown having disposed about the perimeter thereof proximate the opening 5 two outlets 27b and 28b, for example in the case of waterway 26b, and having disposed at the end thereof remote the inlet a threaded portion 25b and 25a. Outlets 29a and 29b have in communication therewith outlet waterways 23a and 23. Outlet waterway 23a extends upwardly from the mixing chamber 20a towards the outlet 29b the use of which will be described hereinafter. Waterway outlet 23 has disposed at the extremes thereof outlets 23d and 23b which serve to return the water from the valve cartridge assembly to the housing and to either the mixing chamber 20a or to the outlet port 29a, the use of which will be described hereinafter.

Extending within the housing and specifically within the ports 25a and 25b, respectively, are found when assembled diverting mechanisms 70a and 70b which are inserted within the openings and placed into communication with the inlets 21 and 22, respectively. The diverting mechanisms 70a and 70b have disposed at the top thereof a head similar to that found within slotted bolts and having disposed below the heads 74a and 74b, respectively, threaded portions 75a and 75b, respectively. The threading will allow the fastening of the diverting mechanisms within the openings and channels 26a and 26b. Preferably the diverting mechanisms 70a and 70b are manufactured from plastic and are hollow through the bottoms thereof to allow any hot and/or cold water to pass through the bottoms thereof and out of one of the outlet openings 71a or 71b, or 72a or 71c. 71a and 72a are disposed at 180° separation upon the perimeter of the diverting mechanism 70a. Further the openings 71a and 72a are not radially aligned. In a similar way when considering the diverting mechanism 70b, the outlets 71b or 71c are not radially aligned and are differentiated by 180°. Further when installed within the opening 25b, 71b will when rotated align with the outlet 27b, or 71c when rotated will align with the outlet 28b. The diverting mechanisms 70a and 70b are therefore provided to allow for a mechanism which can simply redivert the flow of water to the cartridge should the hot or cold water of the valve assembly not be correctly provided for during installation. This feature of the valve will be better described in relation to FIGS. 3, 3a and 3b.

Referring now to the cartridge portion of FIG. 1, there is found an outer sleeve portion 30 having disposed therein annular seals and corresponding grooves 33, 32 and 31. Further disposed within the perimeter of the sleeve and passing through said sleeve are openings 30b and 30a which are illustrated in dotted lines to describe their position in relation to the openings 34 and 31. Member 30 is a stationary member and is fixed within the housing 20 by pin 38a passing through openings 38b and 5a. A hole 37 is disposed at the bottom of outer sleeve 30 wherein will pass a pin 37a disposed upon the internal sleeve 40.

The internal sleeve 40 has as its major purpose a retaining function for the non-aligning seal members 45b and 45a, respectively. The seals are disposed within openings 46b and 46a found at the top and the bottom of the internal sleeve. The seals are anchored by a unique bevelled anchoring lip 49 and 48, the details of which will be described in relation to FIGS. 10 through 12. Disposed about the perimeter of the internal sleeve 40 are sealing members 41 and 42. Openings 47a and 47b are disposed within the sleeve as well to provide for inlets of the water passing through the valve. Internal sleeve 40 is not absolutely necessary in every alternative embodiment of the instant invention but may be eliminated in many instances depending upon the functions of the valves in design. For example the outer sleeve member 30 may contain the non-aligning seal members thus eliminating the need for the internal sleeve. However by providing the internal sleeve, it is felt that a more definite seal is obtained especially when oversized sealing rings 45a and 45b are used.

Internal sleeve 40 has contained therein when assembled the actuation portion of the valve 50 referred to as a stem to which the handle will be affixed upon upper portion 56 for rotation of the stem within the valve cartridge. The stem contains upper and lower arcuate portions 50a and 50b, the use of which will be described hereinafter, but are specifically used to limit the rotation of the valve stem. A seal 50c is provided to ensure integrity of the valve assembly. Further there are provided a multiplicity of inlets 55a through 55d which allow for the passage of water into the stem portion which is preferably hollow in the illustrated invention but not necessarily so in every alternative embodiment thereof. Seals 51a and 51b are provided to prevent the passage of inlet water toward the outlets 53 and 54 in use. Such practice is known within the art.

Contained within the hollow of stem portion 50 is a spool portion having inlet means 61 and 62 disposed about the perimeter thereof and outlets 64 and 63 located at the top and circumscribing the bottom thereof. The spool portion is manufactured from stainless steel and may be machined to the exact tolerances required so that sealing portions 60a, 60b, 60c and 60d will seal against the internal diameter of the stem portion 50 without the use of resilient seals. However, in alternative embodiments of the invention the resilient seals may be used. In the illustrated example of a preferred embodiment of the invention, the spool is a pressure balancing spool allowing for the movement of said spool within the opening disposed within the bottom of the stem portion 50, such that the spool may respond to pressure differentials between the hot and cold water side of the valve. When assembled the valve provides for a cartridge spool valve assembly within a housing wherein the water pressure is continually within the internal spool of the valve, there being no seals to eliminate the flow of water other than the diverting mechanisms 70a and 70b, should replacement of the cartridge be necessary. The only control therefore of the water flow from the valve is upon the outlet ports disposed upon the top and bottom portions of each of the members of the valve cartridge assembly. The water will be therefore free to flow through said outlets unless the resilient sealing means disposed within the internal sleeve 40 prevents the passage of water through the outlets hereinafter described, as best illustrated in relationship to FIGS. 8 and 9.

Figure 2:
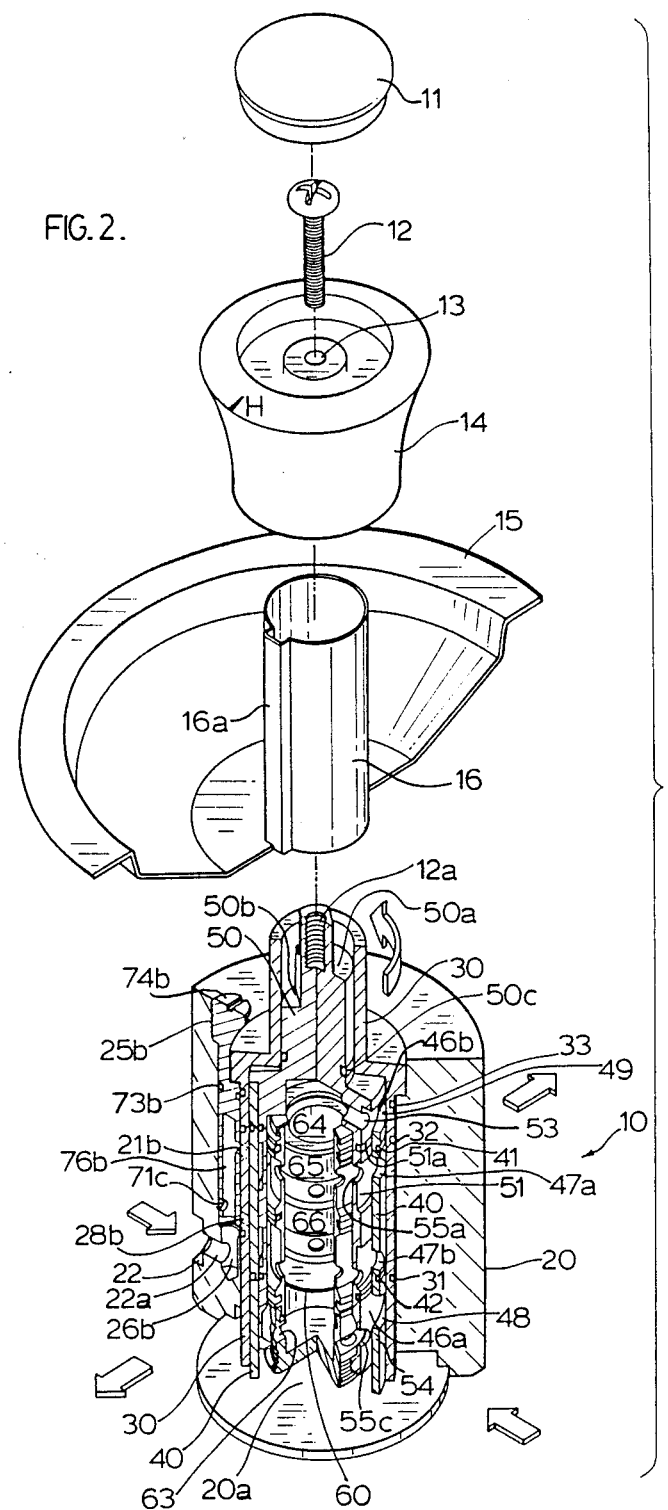
FIG. 2 is a cross-sectional view of the valve assembly partially exploded to illustrate the internal components thereof and the interrelationship of the components thereof in a preferred embodiment of the invention.

Referring now to FIG. 2 wherein the entire valve assembly is illustrated with all of the components assembled with the exception of the control knob which is exploded in order to observe the internal workings of the valve assembly. Thus the valve assembly 10 comprises the housing 20 as described in relation to FIG. 1 having a diverting mechanism 70b located within the opening 25b wherein the water inlet 22 has a channel 22a in communication with the internal opening 26b within which the diverting mechanism is found. A diverting mechanism 70b has a hollow 76b disposed therein to allow for passage of the water through inlet 22 and through to inlets 27b or 28b. In the example illustrated, the diverting means is aligned such that the hole or opening 71b is aligned with the hole or opening 27b. This will allow the passage of water into the upper portion of the valve cartridge assembly and will define the upper inlet portion as for example the hot water portion of the valve. Similarly the diverting mechanism 70a will be aligned to allow for the flow of the cold water to the bottom inlet port of the valve not illustrated. Thus the water will pass through the housing means into the cartridge portion of the valve toward the central openings thereof through the outer sleeve 30 through inlets 34 and 31 through the internal sleeve 40 pinned to the outer sleeve 30 at pin 37a through opening 37 and therefore preventing rotation or any movement of the internal sleeve 40. Therefore the holes or openings 47a and 47b will be in alignment with openings 34 and 31 allowing passage of the hot and cold water into the stem portion of the valve 50 which has openings 55a through 55d disposed thereupon to provide channels as best illustrated in relation to FIGS. 6 and 7 to allow for the passage of flow into the valve center or when used the spool member 60 wherein the spool portion will respond to the pressure differentials between the constant inlet hot and inlet cold water pressures and thereby reduce the amount of either hot or cold water for a given setting should the cold water pressure go down or the hot water pressure go up. Thus it can be seen that the hot water in this example will pass into the chambers 65 while the cold water will pass into the chamber 66 and effect the pressure balancing function of the valve. The hot water will not intermix with the cold water but will pass through outlet 64 then through outlet 53 of member 50 passing through outlet 46$b^1$ disposed upon the internal sleeve and then finally through outlet 30b through to the outlet 23d within the housing and down through a predetermined outlet of the valve. Similarly cold water will pass through the outlet 63 disposed at the bottom of the spool and pass through the hollow stem portion at outlet 54, the internal sleeve portion at outlet 46$a^1$ and the outer sleeve at outlet 30a through to the predetermined outlet of the valve as established by the user.

The interrelationship of the seals disposed upon the perimeter of each of the respective cartridge portions is illustrated in FIG. 2 in order to illustrate how the inlet waterways are kept separate from the outlet waterways at all time and that no internal mixing is accomplished between the hot and cold water streams within the valve cartridge in the preferred embodiment of the invention but it is accomplished within the housing portion of the valve assembly. It may also be observed in relation to FIG. 2 by rotating the valve stem 50 in the direction illustrated in a counterclockwise direction, the interrelationship of the openings as described in relation to FIG. 2 will change, thus the amount of water, hot or cold, passing into the interior of the valve may be limited by the rotation and the registration of the openings disposed within stem portion 50 in relation to a fixed internal sleeve 40 and outer sleeve 30.

Referring now to FIGS. 3, 3a and 3b, a close-up of the diverting mechanisms exemplified by 70b is illustrated, carried within opening 25b within housing 20 and having a hollow 26b in registration with the water inlet 22. Diverting mechanism 70b has seal 73b to prevent the passage of water thereby. As illustrated the hollow 76 as top and bottom disposed an opening 71b and an opening 71c, respectively, which will register with outlets 27b and 28b if rotated for registration. FIG. 3a illustrates the registration of the opening 71b with the outlet 27b thereby allowing the liquid to flow along the path W, $W_1$ and $W_2$ by preventing any fluid from entering the opening 28b having the annular skirt 70$a^1$ covering the opening 28b and preventing the passage of water therein. Alternatively FIG. 3b illustrates a diverter mechanism positioned so that opening 71c registers with opening 28b whereby the annular skirt 70$a^1$ prevents the passage of water through to outlet 27b wherein the flow path of water will be from W to $W_3$ to $W_4$.

In an alternative embodiment of the invention a check valve not illustrated in relation to any of the figures may be disposed within the inlet 22 or 26b, for example, as a safety feature preventing any backflow of water through the valve should the seals fail within the valve.

Referring specifically to FIG. 3, portions 27c and 28c are provided as stops inserted therein within the housing after manufacture of all of the necessary waterways within the housing. It is of course understood that the afore-mentioned members are in one embodiment of the invention and may not be present in all embodiments of the invention should a method be determined for providing the waterways eliminating the need for stops 27c and 28c. Further alternatives exist for the diverting mechanism as illustrated having two portions or openings 71b and 71c located in 180° in non-aligned positions top and bottom of the opening or channel 76 within the interior of the diverting mechanism 70b. It is of course understood that any alternative workable number of openings and diverting positions may be used in relation to the use of such diverting means and not limiting its use through only the passage of hot and cold water.

Referring now to FIGS. 4 and 5, wherein the valve housing 20 is illustrated in part having contained therein the valve stem 50 and the outer sleeve 30. The movement of the stem 50 is restricted by the pin 39 which threadably engages and passes through the outer sleeve 30, the top stem portion thereof, to abut against the arcuate portions $E_2$ and $E_1$, respectively, as the stem 50 is rotated the full extent of its available path. Such a rotation limitation is necessary in order to restrict the alignment of the holes disposed within the cartridge assembly and the alternatives of registration thereof. If such a stop were not provided then it would not be predictable by the user as to the volume of hot and/or cold water passing through the valve to the faucet or shower. By providing such a stop mechanism the flow of water will pass through a cycle as best seen in relation to FIGS. 13 through 15 wherein the mixture of hot and cold water is described without allowance for the adjustment of the volume of the cold or hot water. Such volume adjustment is found within the art and may be depicted in an alternative embodiment of the invention by pushing and pulling the knob portion 13, or by providing a completing separate mechanism for effecting such a purpose.

The head of the pin 39, 39a, is disposed within the channel or retaining groove 16a as best illustrated in relation to FIG. 2 to prevent any movement thereof while using the valve mechanism.

Figure 6:
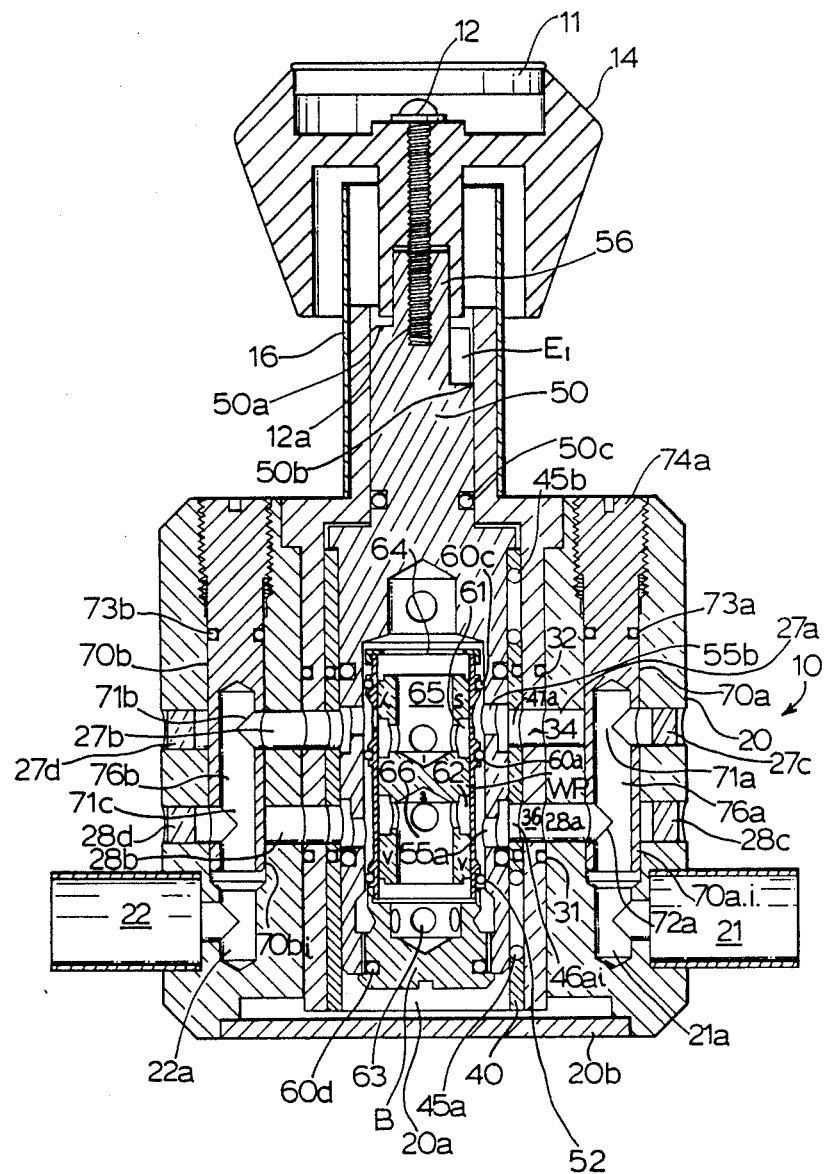
FIG. 6 is a cross-sectional view taken through a plane vertically extending between the inlets 21 and 22 and thereat bisecting the valve in a preferred embodiment of the invention.

Referring now to FIG. 6, the valve assembly is illustrated in cross-section in an attempt to illustrate the flow of hot and cold water into the valve cartridge from the housing in detail. Thus waterways 21 and 22 are provided as inlets to the housing of the valve assembly, said waterways being in communication with channels 21a and 22a, respectively, disposed at the bottom of openings 25a and 25b, respectively. Within the openings are found a diverting mechanism 70a and 70b being hollow through some of their length and having disposed about the hollow an annular skirt 70$b^1$ and 70$a^1$, respectively. Disposed within the skirt are openings 71a and 72a in relation to diverting mechanism 70a, and 71b and 71c in relation to diverting mechanism 70b. The rotation of the diverting mechanisms 70a and 70b will allow for the passage of fluid and specifically hot and cold water through the predetermined inlets. In relation to FIG. 6 the diverting mechanism 70b is aligned such that opening 71b is aligned with port 27b of the housing 20 and such that diverting mechanism 70a and specifically port 72a is aligned with opening 28a of the valve housing 20. Therefore fluid will pass through inlet 21 through opening 21a through the hollow of diverting mechanism 70a through channel 76a into outlet 28a through port 36 of the outer sleeve 30 through port 46a the internal sleeve 40 through the inlet 55a of the rotatable stem 50, through the inlet port 62 of the valve spool and into the chamber 66 at the center of the valve. Similarly the water inlet 22 will allow fluid to pass through waterway 22a through hollow channel 76b passing through opening 71b in said diverting mechanism 70b passing through opening 27b of the valve housing passing through openings 34 of the outer sleeve 46b of the inner sleeve through opening 55b of the rotatable stem and into the opening 61 of the internal spool or poppet entering thereat chamber 65. The water will then pass from chamber 65 through to outlet 64 the passage of which incorporates a similar path to the inlet thereof. Further the water within chamber 66 aside from effecting a pressure balance with the pressure of the water in chamber 65 will pass out through openings 63 toward the outlets of the valve structure similar as the inlet to the valve structure which will heretofore be described in relation to FIG. 7. Disposed at the bottom of the valve as best seen in relation to FIG. 6 is the mixing chamber 20a which incorporates the bottom plate 20b of the housing 20 and the bottom portion of the cartridge, the bottom portion being portion B which describes a mixing chamber 28 between the bottom of the housing and the bottom of the cartridge. Said mixing chamber will be described in relation to FIG. 7.

Figure 7:
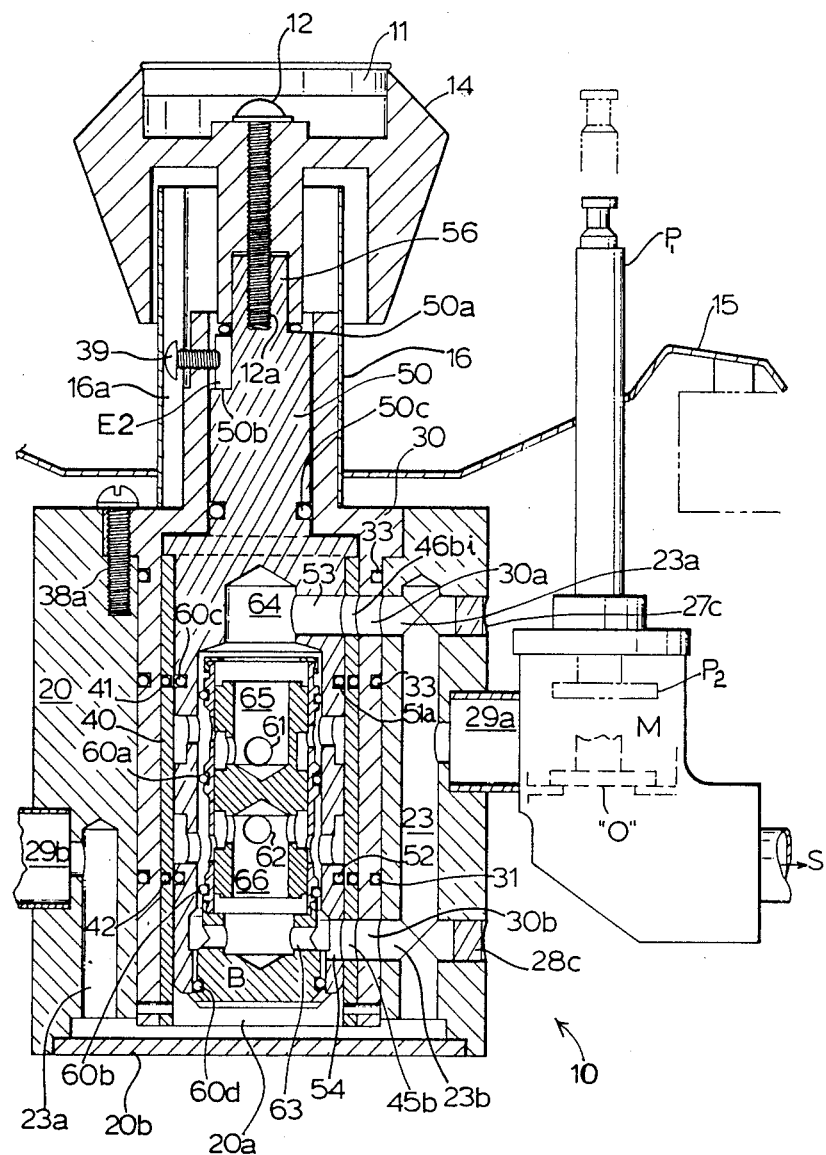
FIG. 7 is a cross-sectional view similar to that illustrated in FIG. 6 taken through a vertical plane passing through the center of the outlets 29a and 29b, respectively, thereby bisecting the valve to illustrate the interrelationship between the components thereof in a preferred embodiment of the invention.

Referring now to FIG. 7, the valve assembly is illustrated in cross-section similar to that found in FIG. 6 with the exception that the cross-section is through a vertical plane bisecting the outlets 29a and 29b respectively. All portions illustrated within the valve assembly are similar to those already described in relation to FIG. 6 with the exception of the path or waterway of outlet water passing through the internal spool and having effected the pressure balancing aspect of the valve in a preferred embodiment of the valve. The water will then flow through outlet 64 of the spool through outlet 53 of the stem through outlet 46b of the internal sleeve 40 through outlet 30a of the outer sleeve 30 through outlet port 23a in communication with waterway 23 disposed within the valve housing. Similarly the fluid disposed within interior chamber 66 will flow through outlets 63 of the spool through outlets 54 of the moveable stem through outlet 45b of the internal sleeve through outlet 30b of the outer sleeve and through outlet 23b of the housing into waterway 23.

Once the fluids pass into waterway 23 they effectively can pass through two paths. One such path is for the fluid to mix and exit through outlet 29a which allows the water to flow toward a shower head S not shown. The passage of the water through outlet 29a is dependent upon the positioning of disk $P_2$ in relation to opening O. Should the disk $P_2$ be positioned by activating plunger $P_1$ into registration with opening O then the water will not flow through outlet 29a but will pass through waterway 23 toward mixing chamber 20a disposed between bottom portion B of stem 50 and the bottom plate 20b of the valve housing. The mixing chamber will affect the mixing of the water to a further extent prior to passing through waterway 23a and outlet 29b. The outlet 29b is in effect the outlet in communication with the faucet not shown. Because the distance between the outlet and the faucet is considerably less than the distance between the shower head and the outlet 29a, a mixing chamber is provided to more thoroughly mix the water which said mixing chamber is deemed unnecessary when considering the shower portion of the valve. Of course the shower portion is not absolutely necessary and may be eliminated from consideration if the instant invention is not embodied in a shower application. Further, the valve may not contain a spool within the hollow center of stem 50 but may contain a solid center of the stem 50 wherein are disposed waterways in communication with and registrable with the openings disposed within the remaining portions of the cartridge. Thus it may be seen that the cartridge may be used and replaced with an equal cartridge or a substitute cartridge not containing all of the attributes of the cartridge being replaced. Further the components of the valve assembly may be manufactured from plastic in order to provide an economical valve.

When the spool portion is not included in the valve and this would be typically found in installations when the valve is installed in a vertical position, such installation of course affecting gravity upon the spool and preventing for the unique pressure balancing attributes of the spool. Further if the valve is embodied and installed within a horizontal position, the valve may or may not incorporate the spool but in the preferred embodiment such spool exists. The pressure balancing aspect of the spool is considered to be a safety measure whereat if the cold water volume is cut off to the valve for reasons such as the turning on of a tap in the household at another sink then in normal instances the hot water volume in proportion to the cold water volume will increase creating a scalding problem as is well known in the prior art. Thus as one of the options of the instant invention a preferred embodiment includes a non-scald spool incorporated in the valve which will respond to and close down on the hot water inlet should the volume of cold water be decreased. Further, should in the case of a ruptured line, the water line supplying the cold water to the valve rupture entirely cutting off the flow of cold water, the flow of hot water will also further be cut off. Thus a safety feature in this valve provides for more than that found within the prior art in that not only does the valve compensate for the differential in the volume available in either the hot or cold water to a pre-established setting, but also safety features are built into the valve to prevent a presentation of water other than of a predetermined mix as defined by the user. The pressure balancing spool provided may be of any alernative configuration but preferably has the features as illustrated in relation to FIG. 1 wherein the outlet at the top 64 and the outlets at the bottom 63 provide for the passage of water after the pressure balancing has been effected. The internal workings of the spool are illustrated best in FIGS. 6 and 7 wherein a wall portion WP of the spool element separates the two chambers 65 and 66, respectively, having a concave portion described in said wall portion 1 and 2 against which the water pressures of each chamber will be applied. As the water pressure is balanced then the ports illustrated in relation to FIG. 6 and specifically port 61 will allow passage of water as they are not being blocked by any portions of the spool element portions S, T, U or V.

When the spool element for example is pushed in the direction toward discharge 64 then the portion V will close down on the inlet 62 thereby preventing the passage of fluid into the spool and hence out of the spool or if not preventing, shutting down on the cross-section area of the opening of the inlet 62. Further if the spool element should move in a direction consistent with a greater force overcoming the fluid force within chamber 66, then portions T and S may cover portions of the inlet 61 and thereby preventing the ingress of fluid into the chamber 65 resulting in a reduction in the flow of the higher pressured fluid. Such a reaction will result in a balancing of the fluid volume entering the valve and exiting the valve. Such a mechanism is well known in the art, however the preferred embodiment incorporates features which are unique to the instant invention and therefore offered for information purposes.

Figure 8:
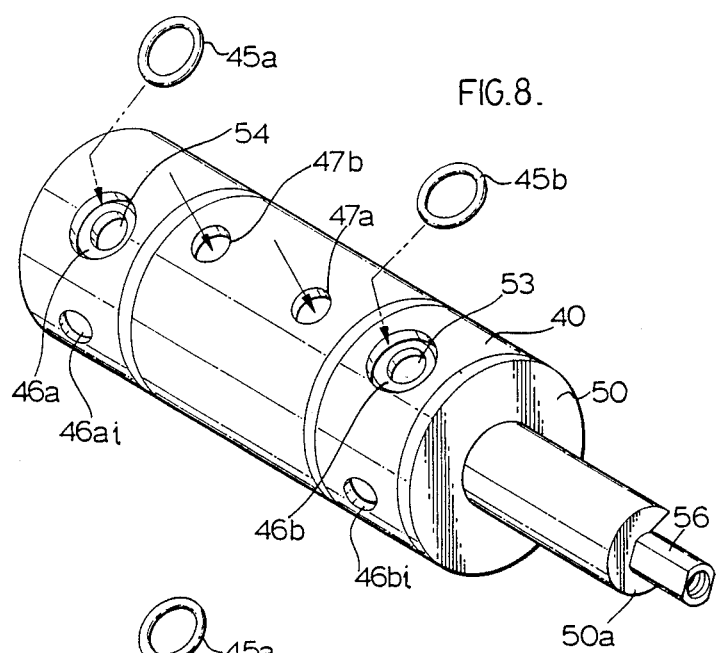
FIGS. 8 and 9 illustrate the interrelationship between the internal sleeve portion 40 and the stem portion 50 at two predetermined operating positions of the valve in a preferred embodiment of the invention.
Figure 9:
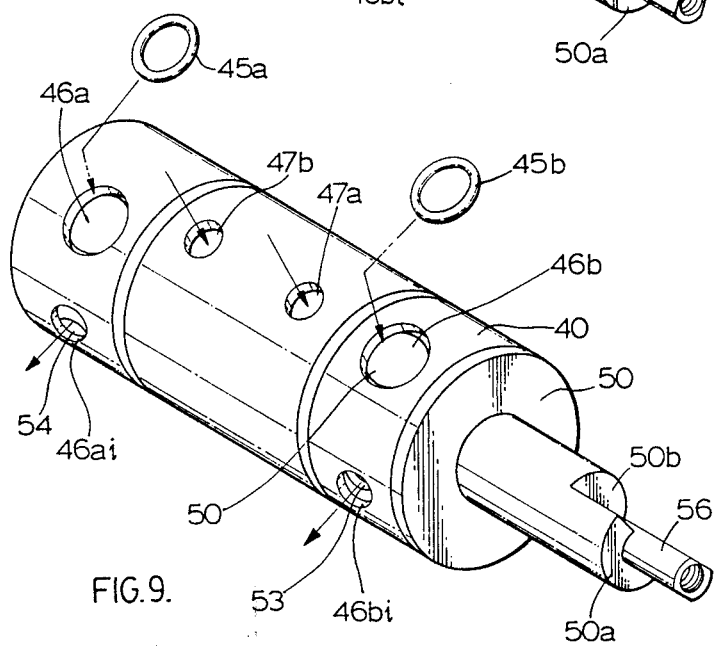

Referring now to FIGS. 8 and 9, wherein the seals 45b and 45a disposed within the internal sleeve 40 are illustrated in relation to the outlets which they circumscribe 46a and 46b, respectively. Referring to FIG. 8, the relationship between the outlets 53 and 54 of stem 50 and their registration with outlets 46a and 46b of the internal sleeve and the resilient mounting of the seals 45a and 45b prevent the flow of fluid through the valve and out the openings thereof beyond outlet 53. Such is accomplished by the pressing of the seals 45b and 45a against the annular surface of the internal diameter of the outer sleeve 30. Such seals 45a and 45b are oversized in order to effect this stoppage of the water flow. Of course since the valve incorporates only two shut-off seals it is imperative that the integrity of these seals be maintained at all times. Therefore the seals 45a and 45b only come into registration with the outlets 53 and 54 when the flow of fluid through the valve and specifically through the outlets ceases. The pressure behind the flow of each fluid is available through to the outlets at all times in operation of the valve. However, the seal prevents the passage of fluid through outlets 46b$^1$ and 46a$^1$ until such time as the stem is rotated to prevent the sealing surfaces of seals 45b and 45a from effecting the stoppage of flow wherein the fluid will initially pass circumferentially around the stem and pass through openings 46b$^1$ and 46a$^1$ respectively. FIG. 9 illustrates the partial registration of openings 54 and 53 of stem 50 with openings 46a$^1$ and 46a$^1$ of internal sleeve 40. Such a registration will describe in a preferred embodiment half cold and half water position for the instant invention. However such a positioning is predetermined by the interrelationship of the openings in the sleeve in relation to the openings of the stem. As best observed in FIG. 9, the seals are out of line of flow of the fluid and thus are not subject to degrading as those seals found in the prior art, as a result of the action of hot water against the for example neoprene rubber or the accumulation of scale and sediment under the seal causing the longterm degradation thereof.

Referring now to FIGS. 10, 11 and 12, there is illustrated the positioning of the resilient seal 45b for example in opening 46b of the internal sleeve 40. The internal sleeve 40 having disposed proximate the bottom of the opening 46b adjacent the stem 50 and in FIG. 10 the opening 53 of stem 50 bevelled portions L which provide a compression member against which the resilient seal 45b may compress while preventing the degradation of the seal within opening 46b as illustrated in FIG. 11 by preventing the contact of the seal with any sharp corners other than those of bevelled portion L. Further the seal 45b is oversized as illustrated best in relation to FIG. 12 wherein the seal will compress against the internal diameter of outer sleeve 30 to effectively seal off the flow of fluid through opening 53 and 46b as illustrated in relation to FIG. 8. Thus the seal will be anchored within the opening 46b and registered or aligned therein in relation to the stem portion 50 by rotation thereof as illustrated in relation to FIGS. 8 and 9 without binding, twisting or loosening of the seal and further by preventing the degradation of the seal in relation to accumulation of scale and sludge thereabout.

Figure 13:
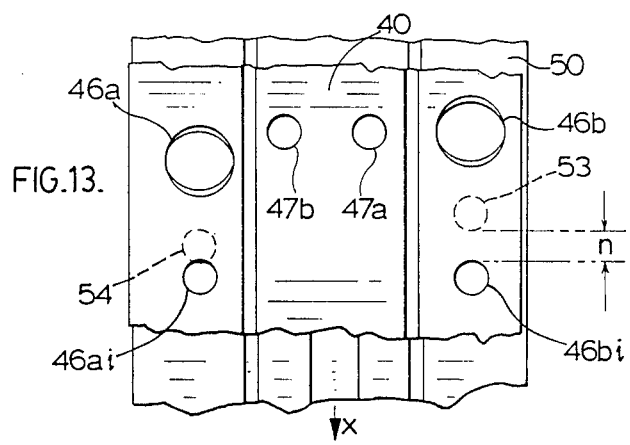
FIGS. 13, 14 and 15 illustrate in schematic fashion the interrelationship between the openings disposed on the internal sleeve 40 in relationship to the openings disposed upon the stem portion 50 in a preferred embodiment of the invention.
Figure 14:
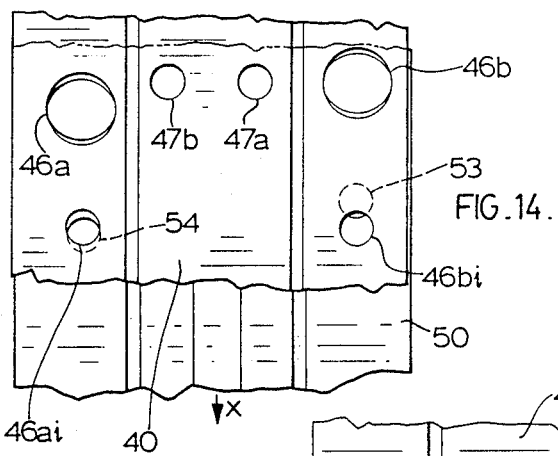
Figure 15:
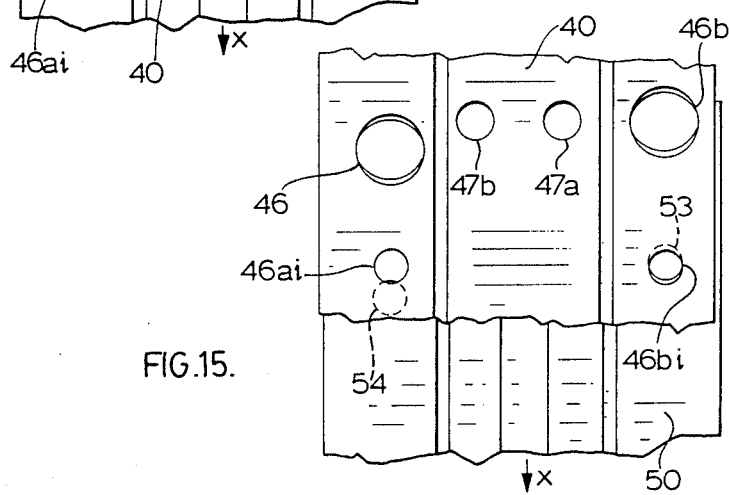

Referring now to FIGS. 13, 14 and 15, a schematic series of views are presented illustrating the relationship of the openings in stem 50 in relation to the internal sleeve 40 as best illustrated in FIGS. 8 and 9 to depict the registration of the openings and specifically the outlets which control the flow of fluid from the valve of the preferred embodiment of the invention. Thus in FIG. 13 is illustrated a start of the cycle wherein outlet 54 of the stem portion 50 is illustrated in very slight registration with outlet 46a$^1$ of the internal sleeve 40. At the same time the outlet 53 which is a hot water outlet is differentiated distance N from the outlet 46b$^1$ such that cold water may flow initially during the starting cycle of the valve but hot water will not pass through the valve until such time as illustrated in FIG. 14 that outlet 54 is in substantial registration with outlet 46a$^1$ wherein that coincident point in a cycle of the valve outlet 53 for hot water will come into very slight registration with the outlet 46b$^1$ of the valve allowing the passage of some hot water therethrough until such time as illustrated in FIG. 15 that the cold water port 46a$^1$ and 54 are in slight registration but the hot water port 53 and 46b$^1$ are in substantially complete registration illustrating a full hot position of the valve. By determining the lag or lead of the hot water port in relation to the cold water and differing the interval and different settings of the valve may be accomplished. Thus by providing the openings in the sleeve 40 in relation to the openings 54 and 53 alternative cycles may be determined within preferred embodiments of the invention.

Thus a valve assembly has been provided which incorporates unique features for a cycled valve and used in a preferred embodiment as a shower pressure compensating non-scalding valve assembly incorporating all the portions described above in a unique cartridge which may be removed from the valve assembly by rotating of the diverting mechanisms 70b and 70a, respectively, such that inlets 27a, 28a, 27b and 28b are blocked by the circumferential skirts 70a$^1$ and 70b$^1$, respectively, thereby cutting off the flow of water to the valve completely and allowing for the removal of the cartridge by removing the corresponding fastening mechanisms 12, 38a and bottom cartridge portion B and removing the entire cartridge and replacing the said cartridge without requiring an installer to visit one's home and without requiring the need to go down into the basement of the home and shut off the hot water to the hot water heater and further to shut off the cold water supplied to the house to enable one to change one valve at one point.

By providing the unique diverting mechanisms, the water supply may be shut off entirely to both sides of the valve both hot and cold without the danger of flooding and without the nuisance of creating a air hammer situation within the household pipes wherein the pipes must be bled from all air contained therein and then flushed. The instant invention provides a unique assembly which the householder may maintain without worrying about degradation of seals, however should maintenance be required the maintenance may be effected by the householder.

The valve incorporates many safety features which also makes the householder's job of maintaining the valve much simpler than ever before.

As many changes may be made to the preferred embodiments of the invention without departing from the scope of the invention, it is intended that all matter contained herein be interpreted as illustrative of the invention and not in a limiting sense.

We claim:

1. For use with at least one fluid, a valve housing having a separate valve actuation means contained therein in use the valve actuation means being a cartridge assembly, said valve housing having two ends and having disposed therein at least one inlet passage and at least one outlet passage, said housing comprising at least one opening extending within said housing from proximate one end thereof and extending towards the other end thereof, at least one each of said inlet passages and outlet passages being in communication with said at least one opening, each opening having disposed therein a flow diverting means of a predetermined dimension having two ends and compatibly shaped with each housing opening and extending from one end within said housing in use, each diverting means being hollow throughout some of its predetermined dimension proximate an inlet passage and having at least two ports disposed upon the perimeter of each diverting means and joined by said hollow, each diverting means being moveable to align the hollow proximate with an inlet passage if not initially aligned, one of said at least two ports being moveable into alignment with one of said at least one outlet passages when the hollow is aligned with an inlet passage; whereby in operation when one of the at least one inlet passages of said housing is aligned with one of said hollows of said diverting means, the flow of fluid will pass through one of said at least one inlet passages to one of said hollows of the diverting means, the fluid thereafter passing through the hollow extending through the interior of said diverting means and the aligned inlet passage to one of said at least two ports of the diverting means, whereat the fluid passes from the valve housing through the at least one inlet passage, through the hollow of the diverting means through one of the ports thereof to the separate valve actuation means being a cartridge assembly of the valve contained within the housing, whereby said diverting means may be moved to redirect the flow of fluid from said at least one inlet passages to facilitate the proper functioning of the valve actuation means.

2. The valve housing of claim 1 wherein said at least one fluid is hot and/or cold water.

3. The valve housing of claim 1 or 2 wherein said at least one opening is cylindrical.

4. The valve actuation means contained within the valve housing of claim 1, comprising a spool cartridge comprising at least two concentric cylinders of predetermined length one moveable and one stationary in use wherein at least one of the concentric cylinders contains seals disposed within openings therein, said openings being disposed about the perimeter of the at least two concentric cylinders wherein the seals are disposed in some of the openings on one of the cylinders in use away from the flow of fluid during operation of the valve and are aligned into registration with openings disposed on another cylinder when the fluid flow is ceased.

5. The valve actuation means of claim 1, comprising a spool cartridge, said spool cartridge comprising at least two concentric cylinders wherein are disposed openings about the circumference of the at least two cylinders, some of said openings on one of said cylinders containing therein sealing means for engagement with corresponding openings disposed within another of said cylinders, one of said cylinders comprising a moveable stem portion having contained therein openings for registration with the openings disposed within the other cylinders, some of said openings disposed within said moveable stem for engagement with sealing means disposed within one of said cylinders when the flow of the fluid within the valve actuation means ceases thereby insuring the integrity of the sealing means and reducing the risk of deterioration thereof.

6. The valve actuation means of claim 4 comprising a spool cartridge, said spool cartridge comprising at least two concentric cylinders wherein are disposed openings about the circumference of the at least two cylinders, some of said openings on one of said cylinders containing therein sealing means for engagement with corresponding openings disposed within another of said cylinders, one of said cylinders comprising a moveable stem portion having contained therein openings for registration with the openings disposed within the other cylinders, some of said openings disposed within said moveable stem for engagement with sealing means disposed within one of said cylinders when the flow of the fluid within the valve actuation means ceases thereby insuring the integrity of the sealing means and reducing the risk of deterioration thereof.

7. The valve actuation means of claim 5 wherein said moveable stem portion has disposed therein a hollow wherein a pressure balancing spool having a moveable spool element disposed therein and having second inlet passages disposed therein, and being contained within the hollow within said stem, said second inlet passages being a communication with a hot and a cold water chamber disposed within the spool element which effects the pressure balancing action of the actuation means, said hot and cold water chambers being in communication with second outlet passages disposed within the perimeter of the spool whereby when the flow of hot water is increased in relation to the flow of cold water, said spool element will move in a direction to compensate for the increase in hot water in a direction whereby the openings disposed within the spool for the hot water are closed by the blocking movement of the perimeter of the spool element in relation to the openings disposed within the perimeter of the spool, wherein if the cold water volume increases beyond a set level of the valve, said spool element will move in a direction such that the perimeter of said spool element will narrow the openings disposed within the spool for cold water resulting in a reduction of the volume of cold water passing to the spool and thus balancing the valve at its preset operating temperature.

8. The valve actuation means of claim 6 wherein said moveable stem portion has disposed therein a hollow wherein a pressure balancing spool having a moveable spool element disposed therein and having second inlet passages disposed therein, and being contained within the hollow within said stem, said second inlet passages being a communication with a hot and a cold water chamber disposed within the spool element which effects the pressure balancing action of the actuation means, said hot and cold water chambers being in communication with second outlet passages disposed within the perimeter of the spool whereby when the flow of hot water is increased in relation to the flow of cold water, said spool element will move in a direction to compensate for the increase in hot water in a direction whereby the openings disposed within the spool for the hot water are closed by the blocking movement of the perimeter of the spool element in relation to the openings disposed within the perimeter of the spool, wherein if the cold water volume increases beyond a set level of the valve, said spool element will move in a direction such that the perimeter of said spool element will narrow the openings disposed within the spool for cold water resulting in a reduction of the volume of cold water passing to the spool and thus balancing the valve at its preset operating temperature.

9. A reversible modular valve assembly, for use with hot and/or cold water said modular valve assembly comprising, a housing and valve, the valve including a replaceable cartridge assembly, said housing having two ends and having at least two inlet passages disposed within said housing for allowing the passage of hot and cold water through each of one of said inlet passages, said housing comprising at least one opening extending within said housing from proximate one end thereof extending towards the other end thereof, said at least one opening having disposed upon the perimeter thereof at least two outlet passages being in communication with said at least one opening and being disposed about the perimeter of the extension of said opening; said opening having disposed therein at least one flow diverting means having two ends and being of a predetermined dimension compatibly shaped with said at least one opening and extending within said housing in use, each diverting means being hollow throughout some of its predetermined dimension proximate an inlet passage and having at least two ports joined by said hollow disposed upon the perimeter thereof, said diverting means being moveable to, if not already aligned, align the hollow thereof with one of said at least two inlet passages of said housing wherein one of said ports of said diverting means is moveably aligned with one of said outlet passages of said openings when the hollow is aligned with one of said at least one inlet passages, whereby in operation when one of the at least two inlet passages of said housing is aligned with the hollow of said diverting means, the flow of fluid will pass through one of said at least two inlet passages through said hollow of the diverting means, through the hollow extending through the interior of said diverting means to one of said at least two ports through to one of said at least two outlet passages whereat the hot and/or cold water passes from the housing of the valve to a valve actuation means of the valve being a cartridge assembly contained within said housing, whereby said diverting means may be moved to redirect the flow of hot and/or cold water from said at least two inlet passages to facilitate the proper functioning of the valve actuation means; said housing further comprising at least a second opening extending from proximate one end of the valve housing to proximate the other end of the housing, said at least a second opening having contained therein in use a replaceable cartridge comprising the valve actuation means of the valve, said replaceable cartridge having two ends and having disposed at one end thereof control means for controlling the positioning of the valve, said control means allowing for the movement and registration of the components within the cartridge assembly, said cartridge assembly comprising at least two hollow cylindrical members, said at least two hollow cylindrical members having disposed within the circumference thereof between their ends openings which are in registration with the outlet passages of said housing to allow for introduction of hot and cold water into the cartridge assembly, some of said openings on one of said cylinders including sealing means therein for sealing engagement with some of the openings on another of said cylinders in use, one of said at least two cylindrical members comprising a stem portion having disposed at one end thereof the control means of the valve cartridge, said stem portion extending from one ends of the housing and said stem portion having disposed therein about the circumference thereof between the ends thereof openings which align in use with the openings of one of the remaining cylindrical portions containing the sealing means, said stem portion being moveable in relation to said cylindrical portions and to the sealing means contained therein wherein some of the sealing means disposed within some cylindrical portions are out of alignment with the flow of hot and-/or cold water during the operation of the valve and engage some of the openings of said stem portion only when the valve flow ceases and the openings containing the sealing means are in registration with some of the openings disposed within the stem portion, said stem portion having contained therein openings passing through to the hollow thereof some of said openings being in communication with some of the openings disposed upon the remaining cylindrical members and being in communication with the outlet passages disposed within said housing.

10. The modular valve assembly of claim 9 wherein the opening extending within said housing is cylindrical.

11. The modular valve assembly of claim 9 or 10 wherein said stem portion is hollow at said one end thereof remote said control portion.

12. The modular valve assembly of claim 9 or 10 wherein the housing has disposed therein a mixing chamber being in communication with the outlet passages of said housing when transferring the water from the cartridge portion of the valve to the housing portion of the valve through to a faucet or shower head.

13. The modular valve assembly of claim 11 wherein the housing has disposed therein a mixing chamber being in communication with the outlet passages of said housing when transferring the water from the cartridge portion of the valve to the housing portion of the valve through to a faucet or shower head.

14. The modular valve assembly of claim 9 or 10 wherein the stem portion of said cartridge has contained within the hollow thereof a pressure balancing spool having a moveable spool element disposed therein, the spool having second inlet passages and second outlet passages disposed upon the circumference thereof, said second inlet passages being in communication with a hot water first chamber and a cold water second chamber, said second inlet passages allowing for the passage of water into said chambers thus affecting the pressure balancing of the valve assembly, said spool element comprising a wall portion having two ends separating said first and said second chambers, said wall portion having disposed within the surface thereof substantially concaved portions of predetermined dimensions which translate any pressure gradient between said first chamber and said second chamber, said spool element thus floating within the hollow of said spool in a direction consistent with the pressure gradient between said first and said second chamber as exerted upon the wall portions thereof allowing for the movement of said spool element in the direction of the higher water pressure, wherein the perimeter of the spool element moves in relation to the openings disposed upon the perimeter of the spool thus affecting a reduction in the passage through which the fluid exerting the greater pressure passes.

15. The modular valve assembly of claim 11 wherein the stem portion of said cartridge has contained within the hollow thereof a pressure balancing spool having a moveable spool element disposed therein, the spool having second inlet passages and second outlet passages disposed upon the circumference thereof, said second inlet passages being in communication with a hot water first chamber and a cold water second chamber, said second inlet passages allowing for the passage of water into said chambers thus affecting the pressure balancing of the valve assembly, said spool element comprising a wall portion having two ends separating said first and said second chambers, said wall portion having disposed within the surface thereof substantially concaved portions of predetermined dimensions which translate any pressure gradient between said first chamber and said second chamber, said spool element thus floating within the hollow of said spool in a direction consistent with the pressure gradient between said first and said second chamber as exerted upon the wall portions thereof allowing for the movement of said spool element in the direction of the higher water pressure, wherein the perimeter of the spool element moves in relation to the openings disposed upon the perimeter of the spool thus affecting a reduction in the passage through which the fluid exerting the greater pressure passes.

16. The modular views assembly of claim 12 wherein the stem portion of said cartridge has contained within the hollow thereof a pressure balancing spool having a moveable spool element disposed therein, the spool having second inlet passages and second outlet passages disposed upon the circumference thereof, said second inlet passages being in communication with a hot water first chamber and a cold water second chamber, said second inlet passages allowing for the passage of water into said chambers thus affecting the pressure balancing of the valve assembly, said spool element comprising a wall portion having two ends separating said first and said second chambers, said wall portion having disposed within the surface thereof substantially concaved portions of predetermined dimensions which translate any pressure gradient between said first chamber and said second chamber, said spool element thus floating within the hollow of said spool in a direction consistent with the pressure gradient between said first and said second chamber as exerted upon the wall portions thereof allowing for the movement of said spool element in the direction of the higher water pressure, wherein the perimeter of the spool element moves in relation to the openings disposed upon the perimeter of the spool thus affecting a reduction in the passage through which the fluid exerting the greater pressure passes.

17. The modular valve assembly of claim 13 wherein the stem portion of said cartridge has contained within the hollow thereof a pressure balancing spool having a moveable spool element disposed therein, the spool having second inlet passages and second outlet passages disposed upon the circumference thereof, said second inlet passages being in communication with a hot water first chamber and a cold water second chamber, said second inlet passages allowing for the passage of water into said chambers thus affecting the pressure balancing of the valve assembly, said spool element comprising a wall portion having two ends separating said first and said second chambers, said wall portion having disposed within the surface thereof substantially concaved portions of predetermined dimensions which translate any pressure gradient between said first chamber and said second chamber, said spool element thus floating within the hollow of said spool in a direction consistent with the pressure gradient between said first and said second chamber as exerted upon the wall portions thereof allowing for the movement of said spool element in the direction of the higher water pressure, wherein the perimeter of the spool element moves in relation to the openings disposed upon the perimeter of the spool thus affecting a reduction in the passage through which the fluid exerting the greater pressure passes.

18. The valve assembly of claim 9 or 10 comprising stop means disposed within the stem portion of the cartridge for limiting the movement of the stem portion thereof.

19. The valve assembly of claim 11 comprising stop means disposed within the stem portion of the cartridge for limiting the movement of the stem portion thereof.

20. The valve assembly of claim 12 comprising stop means disposed within the stem portion of the cartridge for limiting the movement of the stem portion thereof.

21. The valve assembly of claim 13 comprising stop means disposed within the stem portion of the cartridge for limiting the movement of the stem portion thereof.

22. The valve assembly of claim 14 comprising stop means disposed within the stem portion of the cartridge for limiting the movement of the stem portion thereof.

23. The valve assembly of claim 15 comprising stop means disposed within the stem portion of the cartridge for limiting the movement of the stem portion thereof.

24. The valve assembly of claim 16 comprising stop means disposed within the stem portion of the cartridge for limiting the movement of the stem portion thereof.

25. The valve assembly of claim 17 comprising stop means disposed within the stem portion of the cartridge for limiting the movement of the stem portion thereof.

26. The valve assembly of claim 9 or 10 wherein the seals disposed within the at least two hollow cylindrical members are maintained out of line of the flow of at least the hot water of the valve assembly in use.

27. The valve assembly of claim 14 wherein the seals disposed within the at least two hollow cylindrical members are maintained out of line of the flow of at least the hot water of the valve assembly in use.

28. The modular valve assembly of claim 9 or 10 wherein means are provided within the valve assembly for providing volume adjustment in the valve operation.

29. The modular valve assembly of claim 14 wherein means are provided within the valve assembly for providing volume adjustment in the valve adjustment.

30. The pressure balancing spool of the valve actuation means of claim 7 or 8 comprising a washerless spool element being manufactured with close tolerances to be contained within a hollow of the spool of the valve actuation means, said pressure balancing spool element comprising no washers yet being moveable within the hollow of said spool, and having sealing surfaces disposed on the perimeter thereof when manufactured.

31. The valve housing of claim 1, 4 or 5 incorporating outlet diverting means in communication with said housing to allow for diversion of fluid from the outlet of said housing to a faucet or to a shower head.

32. The valve housing of claim 7, 9 or 14 incorporating outlet diverting means in communication with said housing to allow for diversion of fluid from the outlet of said housing to a faucet or to a shower head.

33. The modular valve assembly of claim 9 or 10 wherein the openings within some of the cylinders comprise bevelled portions within the perimeter of said openings which anchor the sealing means in said openings.

34. The modular valve assembly of claim 14 wherein the openings within some of the cylinders comprise bevelled portions within the perimeter of said openings which anchor the sealing means in said openings.

35. The modular valve assembly of claim 30 wherein the openings within some of the cylinders comprise bevelled portions within the perimeter of said openings which anchor the sealing means in said openings.

36. The modular valve assembly of claim 33, 34 or 35 wherein said sealing means are oversized resilient sealing rings.

37. The valve actuation means of claim 7 wherein said spool is substantially cylindrical in shape.

38. For use with at least one fluid, a valve housing having a separate valve actuation means contained therein in use the valve actuation means being a cartridge assembly, said valve housing having two ends and having disposed therein at least one inlet passage and at least two outlet passages, said housing comprising at least one opening extending within said housing from proximate one end thereof and extending towards proximate the other end thereof, at least one each of said inlet passages and outlet passages being in communication with said at least one opening, each opening having disposed therein a flow diverting means extending within said opening in use, each diverting means being moveable to align with an inlet passage if not initially aligned, and being moveable into alignment with one of said at least two outlet passages when aligned with an inlet passage; whereby in operation when one of the at least one inlet passages of said housing is aligned with said diverting means, the flow of fluid will pass through one of said at least one inlet passages to said diverting means, the fluid thereafter passing through said diverting means and the aligned outlet passage, to the separate valve actuation means being a cartridge assembly of the valve contained within the housing, whereby said diverting means may be moved to redirect the flow of fluid from said at least one inlet passages to facilitate the proper functioning of the valve actuation means.

39. A reversible modular valve assembly, for use with hot and/or cold water said modular valve assembly comprising, a housing and valve, the valve including a replaceable cartridge assembly, said housing having two ends and having at least two inlet passages disposed within said housing for allowing the passage of hot and cold water through each of one of said inlet passages, said housing comprising at least one opening extending within said housing from proximate one end thereof extending towards the other end thereof, said at least one opening having disposed therewith at least two outlet passages being in communication with said at least one opening; said opening having disposed therein at least one flow diverting means with said at least one opening and extending within said opening in use, each diverting means for alignment with an inlet passage of said housing, said diverting means being moveable to, if not already aligned, align with one of said at least two inlet passages of said housing with one of said two outlet passages wherein said diverting means is moveably aligned with one of said two outlet passages of said openings when the diverting means is aligned with one of said at least two inlet passages, whereby in operation when one of the at least two inlet passages of said housing is aligned with said diverting means, the flow of fluid will pass through one of said at least two inlet passages through said diverting means through to one of said at least two outlet passages whereat the hot and/or cold water passes from the housing of the valve to a valve actuation means of the valve being a cartridge assembly contained within said housing, whereby said diverting means may be moved to redirect the flow of hot and/or cold water from said at least two inlet passages to facilitate the proper functioning of the valve actuation means; said housing further comprising at least a second opening extending from proximate one end of the valve housing to proximate the other end of the housing, said at least a second opening having contained therein in use a replaceable cartridge comprising the valve actuation means of the valve, said replaceable cartridge having two ends and having disposed at one end thereof control means for controlling the positioning of the valve, said control means allowing for the movement and registration of the components within the cartridge assembly, said cartridge assembly comprising at least two hollow cylindrical members, said at least two hollow cylindrical members having disposed within the circumference thereof between their ends openings which are in registration with the outlet passages of said housing to allow for introduction of hot and cold water into the cartridge assembly, some of said openings on one of said cylinders including sealing means therein for sealing engagement with some of the openings on another of said cylinders in use, one of said at least two cylindrical members comprising a stem portion having disposed at one end thereof the control means of the valve cartridge, said stem portion extending from one end of the housing and said stem portion having disposed therein about the circumference thereof between the ends thereof openings which align in use with the openings of one of the remaining cylindrical portions containing the sealing means, said stem portion being moveable in relation to said cylindrical portions and to the sealing means contained therein wherein some of the sealing means disposed within some cylindrical portions are out of alignment with the flow of hot and/or cold water during the operation of the valve and engage some of the openings of said stem portion only when the valve flow ceases and the openings containing the sealing means are in registration with some of the openings disposed within the stem portion, said stem portion having contained therein openings passing through to the hollow thereof some of said openings being in communication with some of the openings disposed upon the remaining cylindrical members and being in communication with the outlet passages disposed within said housing.

* * * * *